United States Patent Office 2,925,580
Patented Feb. 16, 1960

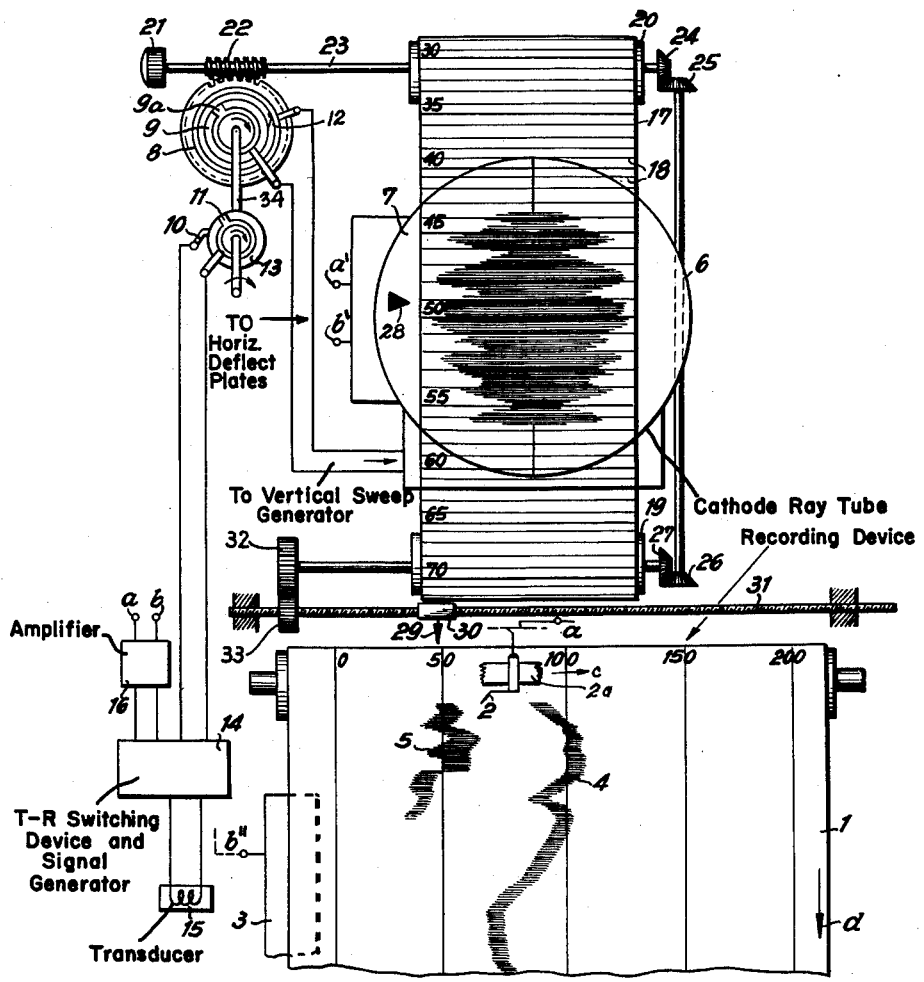

---

2,925,580

ECHO SOUNDING SYSTEM

Martin Schumacher, Bremen, Germany, assignor to Atlas-Werke Aktiengesellschaft, Bremen, Germany Application June 1, 1953, Serial No. 358,614

5 Claims. (Cl. 340—3)

The invention relates to a device using the echo sounding method for the indication of distances. It is well known that sound echoes returning from reflecting objects below on ocean surface are not only used for the indication of the distance of the objects from the surface, but conclusions can also be drawn with regard to the reflecting objects themselves. For this purpose cathode ray tubes are used which indicate the oscillatory form of the received echoes. The time deflection of the cathode ray on the screen of the cathode ray tube is thereby chosen at such a rate that a satisfactorily large indication of the echo is attained. The cathode ray tube consequently gives only a small section of the total measuring range. The position within the total measuring range of the displayed partial range, which, generally is fixedly adjusted to cover an invariable depth range of between 10 and 20 meters, may be arbitrarily chosen by suitably delaying the start of the sweep of the electron beam with respect to the emission of each sounding pulse. The depth corresponding to the setting of the delay device is read on a separately disposed scale. An echo depth recorder covering the whole of the measuring range has been combined with a cathode ray tube for expanded display of a selected partial range or echoes respectively, which combination has proved useful for fishing vessels.

The necessity for reading a separately disposed depth scale when positioning or verifying the adjustment of the position of the partial range display has proved to be distracting and cumbersome. It is an object of the present invention to remedy this deficiency of known apparatus by providing a numbered scale arranged contiguous to the sweep of the electron beam and displaced lengthwise simultaneously with the setting of the depth position of the partial range display so as always to present the right depth indication for the adjacent expanded display.

A further object of the invention is to provide pointer means contiguous to the stylus sweep of the recorder and displaced parallel to that sweep simultaneously with the setting of the depth sweep simultaneously with the setting of the depth position of the partial range display so as always to indicate the place on the chart where echoes appearing in the expanded display are recorded.

The various objects and advantages of my invention will be more apparent upon considering the following description of an embodiment thereof illustrated in the accompanying drawing.

Fig. 1 shows an echo sounder with combined means for displaying indications of echoes by an echograph and a cathode ray tube. An echograph is used as recording device which operates with amplitude recording of echoes which indicate not only the position but also the dimensions of the reflecting object. Such recording instruments are preferably used for echo sounding on ships as it has become customary to not only determine the depth of water but also to detect schools of fish. For this purpose electric recording devices are particularly suited which work with graphite paper or any similar marking means. A recording strip 1 is thereby provided with an electro-sensitive graphite layer which is covered with a thin, non electro-sensitive layer of different colour. When current flows through the marking stylus 2 this layer is burned or melted away whereby the black graphite layer becomes perceptable. The intensity of the blackening thus obtained depends upon the current intensity so that the intensity of the echo can be recognized from the degree of blackening. The current entering from the marking stylus 2 to the graphite layer will return through a large size contact 3 closely touching the recording strip.

The marking stylus 2 synchronized to the beat of the echo sounding is slowly moved in direction of the arrow c across the recording strip slowly moving in direction of arrow d. The marking stylus is attached to a revolving endless band, part of which is shown at 2a. For the sake of facility of inspection the drive of the marking stylus is not shown in the drawing. The speed at which the marking stylus is travelling across the recording strip has been selected in such a manner that the entire interesting depth range of for instance 0 to 200 meters is delineated on the recording strip.

The recorded echo as shown in the drawing illustrates a sea bed curve 4 in a depth of 50 to 100 meters and the echo image 5 illustrates a school of fish in a depth of 50 meters. This recording shows that the echo caused by the fish in a depth of 50 meters is more feeble than the other one. In order to indicate more clearly this feeble echo obtained from fish a second indicating device consisting of a cathode ray tube 6 is provided. The cathode ray is deflected downwards along a vertical diameter at such a speed that the corresponding spot on the screen 7 of the cathode ray tube 6 travels across the screen in an interval of time which corresponds approximately to a depth range of 20 meters. The depth corresponding to the beginning of this range is continuously adjustable by an adjustable contact ring 8 with a brush 12 attached to it and sliding on a revolving contact disc 9 with a contact 9a. By adjusting the contact ring 8 the triggering of the time deflection of the spot is altered relative to the emission of the signal. The emission is controlled by another contact disc 13 with contact 11 which is fixed to the same shaft 34 as the contact disc 9, and revolved at the same speed. If the contact ring 8 with its brush 12 is rotated relative to the brush 10 by an angle corresponding to the period of time necessary for the signal to travel to a depth of 50 meters and back, the zero point of the time deflection of the spot is displaced relative to the zero point of the time deflection of the stylus by 50 meters and the echo returning from a depth range between 50 to 70 meters will be visible on the screen. The contacts 10, 11 cause the emission of the signal by a transducer 15 through a switching device 14. After emission of the sound impulse the transducer is automatically switched for reception until the next emission, occurring after a complete revolution of the contact disc 13. After amplification by an amplifier 16 the returning echo signals are transmitted both to the recording device and to the horizontal deflection plates of the cathode ray tube. The output terminals $a$, $b$ of amplifier 16 are connected to the horizontal deflection plates of cathode ray tube 6 through terminals $a'$, $b'$ and to the recording device through terminals $a''$, $b''$ by leads not shown.

In order to enable to read the range represented on the screen a transparent depth scale 17 is provided which is drawn across the screen simultaneously with the rotation of the contact ring 8. The readings on the scale immediately give the correct depths for the echoes seen on the screen. The scale is drawn on a clear transparent film strip. The scale runs over the middle of the screen and comprises thin graduation lines 18 with scale numbers printed on the left side on the screen.

The scale film is wound on spools 19, 20 which are driven in the same direction of rotation by a control knob 21, a shaft 23 and two bevel wheel gears 24, 25 and 26, 27. A worm 22 is fixed to the shaft 23 and engages the teeth of the contact ring 8 the position of which is adjusted simultaneously with the shifting of the scale. An index mark 28 is painted on the screen of the cathode ray tube. The depth read at this mark is the same as that recorded by the stylus. From the echo image on the screen shown in Fig. 1 it is seen that the school of fish begins at a depth of 44 meters and ends at about 56 meters.

In order to facilitate the setting of the sweep delay of the cathode ray tube so as to have a selected recorded echo represented on the screen, a pointer 29 is connected with the adjusting device for the contact ring 8 which is shiftable along the time axis of the echograph. The pointer is fitted to a travelling nut 30 which is driven by the shaft of the film spool 19 via a spindle 31 and spur wheel gears 32, 33.

For closely examining an echo recorded on the recording strip it suffices by turning knob 21 to set pointer 29 on that echo which will then be represented with time scale expanded on screen 7. No depth reading need be made for this adjustment. On the other hand, when viewing the expanded echo on screen 7, the observer may verify its depth location immediately by the figures on the travelling scale strip without referring to a separately disposed scale.

What I claim is:

1. A device for indicating by echo sounding, objects beneath the water surface and above the bottom comprising in combination, recording means for continuously recording on a permanent record objects and depths beneath the surface of the water, and means for recording enlarged temporary views of objects and depths below the surface, said latter comprising in combination with said former, sound transmitting means and sound receiving means, a cathode ray tube operatively connected to said receiving means for enlarged recording of said objects, permanent continuous recording means connected to said receiving means including a marking stylus and continuous tape having a calibrated depth scale for recording the sweep of said stylus of substantially the entire depth range being sounded, a transparent depth scale positioned across the surface of the tube in front of the cathode beam having an enlarged scale relative to said calibrated scale and corresponding to the enlarged scale to which the sweep of the beam of said tube is calibrated, means for adjustably positioning said depth scale in front of said tube, means for adjusting the timing of the sweep of said beam relative to the sweep of said marking stylus, whereby the beam will be actuated over a desired section of said desired depth range, and means for synchronizing the adjustment of said last two mentioned means whereby images received on said tube may be read simultaneously with superimposed indication of the depth of said images.

2. A device as set forth in claim 1 having a marker adjustably positioned relative to said calibrated depth scale and means for adjusting said marker synchronously with the adjustment of said transparent depth scale whereby objects indicated on said permanent continuous recording means may readily be located on said cathode tube.

3. A device as set forth in claim 1 wherein said depth scale is formed on an endless belt mounted on a plurality of rollers, and having an adjustable contact ring controlling the timing of said beam sweep and gear means operatively interconnected with said contact ring and engaging said rollers for rotation thereof.

4. In echo sounding apparatus including transmitting means and receiving means for sounding pulses, rotating contact means for periodical transmission of sounding pulses, means for continuously recording permanently received echo pulses, and means for providing a magnified view of the shape of received echo pulses, said last-named means comprising a cathode ray tube having a rapid sweep of a duration corresponding to a fraction of the entire depth measuring range and deflecting elements connected to the receiving means for deflection of the beam perpendicular to the sweep line in correspondence to received echoes, rotating contact means for triggering the sweep in synchronism with the emission of sounding pulses and manual drive means for adjusting said second contact means for variably delaying the triggering of the sweep in relation to the sounding pulse emission, the combination of said variable sweep delaying means with a transparent scale strip disposed in front of the screen of the cathode ray tube, means for moving said strip in a longitudinal direction parallel to said sweep, indications of depth and scale lines perpendicular to its longitudinal direction on said strip for reading the depths corresponding to echoes represented on the screen, and drive means operatively connected to said manual drive means for simultaneously shifting the transparent scale strip with and in correspondence to the variation of the sweep delay and indicating the position of said transparent scale on a calibrated depth scale on said recording means.

5. In an echo sounding system having transmitting means and receiving means for sounding pulses, cyclically operated contact means for periodical transmission of sounding pulses, a recorder in which a stylus is swept across a recording strip in synchronism with the transmission of pulses and records echoes in locations along the path of the stylus on said recording strip corresponding to the depths of reflecting objects, and means for providing an enlarged view of the shape of received echo pulses, said last-named means comprising a cathode ray tube having a sweep of a duration corresponding to a fraction of the entire depth measuring range and deflection elements connected to the receiving means for deflection of the beam perpendicular to the sweep line in correspondence to received echoes, cyclically operated contact means for triggering the sweep in synchronism with the transmission of sounding pulses, and manually operated control means for adjusting said second contact means for variably delaying the triggering of the sweep in relation to the sounding pulse transmission; the combination therewith of a pointer, means for displacing said pointer on a line parallel and adjacent to the stylus sweep, said last-named means being operatively connected to said manually operated control means to displace the pointer simultaneously with and in correspondence to variations of the sweep delay so that the position of the pointer always indicates the place on the recording strip where the echoes represented on the screen of the cathode ray tube are recorded by the stylus and, reciprocally, which of the recorded echoes are represented on the screen.

References Cited in the file of this patent

UNITED STATES PATENTS

| | | |
|---|---|---|
| 1,983,254 | Turner | Dec. 4, 1934 |
| 2,257,763 | Peterson | Oct. 7, 1941 |
| 2,454,782 | De Rosa | Nov. 30, 1948 |
| 2,710,787 | Witt | Feb. 23, 1952 |
| 2,757,354 | Bolzmann | July 31, 1956 |
| 2,788,509 | Bolzmann | Apr. 9, 1957 |